Nov. 9, 1965
C. W. McCORD
3,216,269
ADJUSTABLE TOOTHED WHEEL
Filed April 9, 1964
2 Sheets-Sheet 1
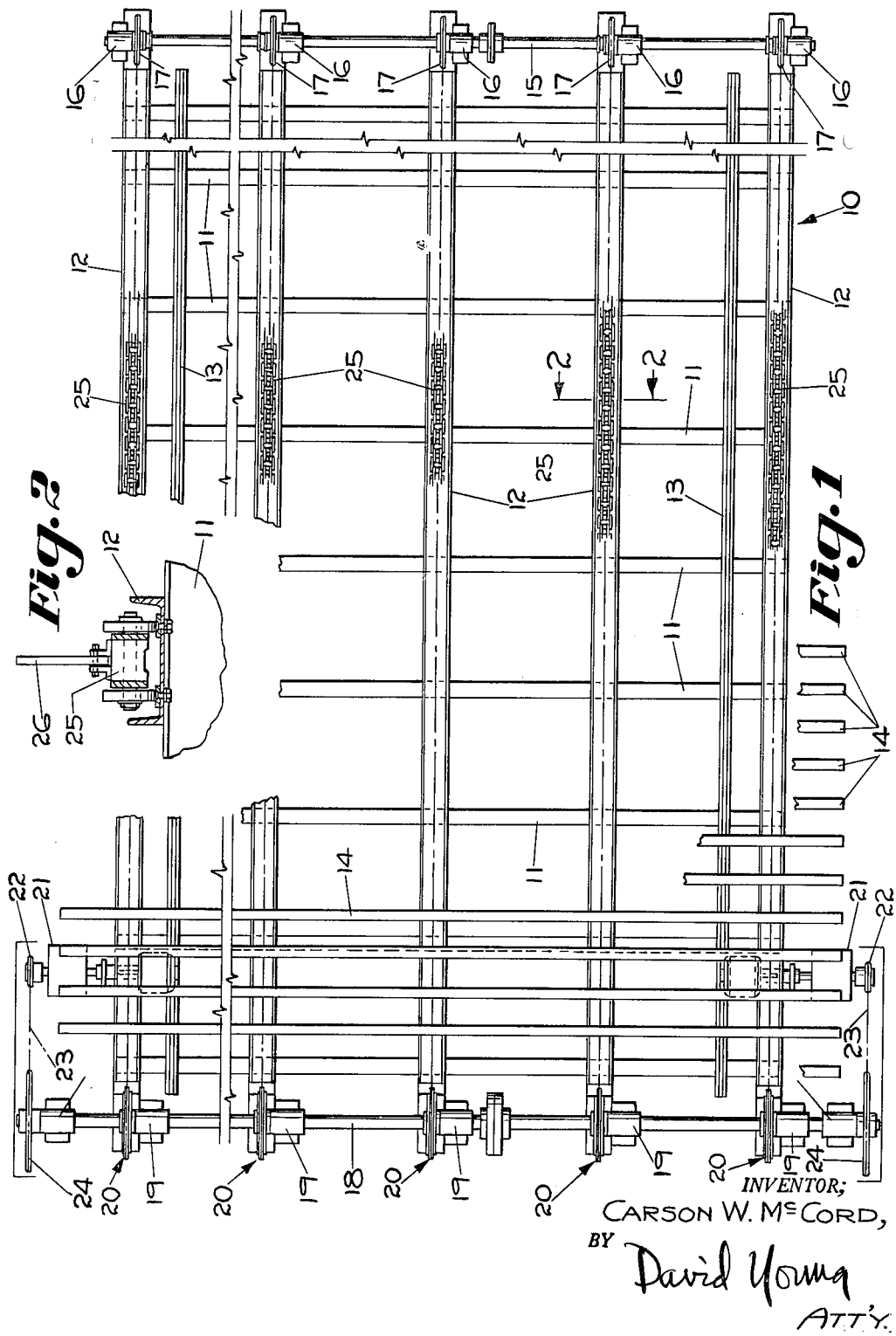
INVENTOR;
CARSON W. McCORD,
BY David Young
ATTY.

Nov. 9, 1965  C. W. McCORD  3,216,269
ADJUSTABLE TOOTHED WHEEL
Filed April 9, 1964  2 Sheets-Sheet 2
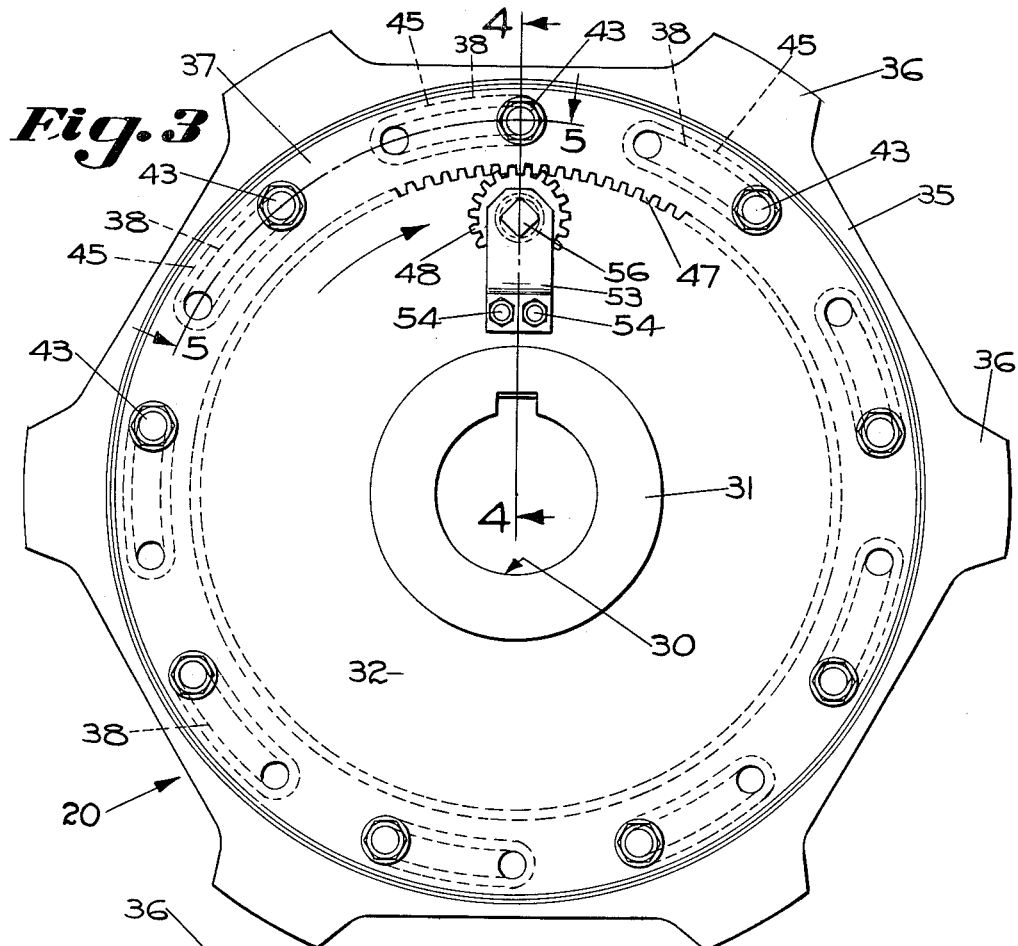
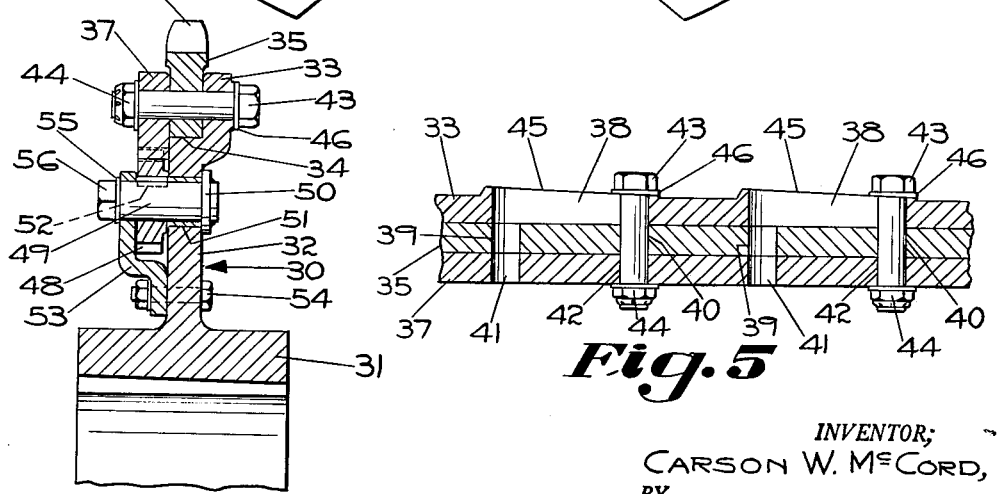
INVENTOR:
CARSON W. McCORD,
BY David Young
ATT'Y.

3,216,269
ADJUSTABLE TOOTHED WHEEL
Carson W. McCord, Worthington, Ohio, assignor to The Jeffrey Galion Manufacturing Company, a corporation of Ohio
Filed Apr. 9, 1964, Ser. No. 358,452
7 Claims. (Cl. 74—243)

The instant invention relates to an adjustable toothed wheel, which may be a sprocket or the like, in which the toothed part of the wheel is adjustable.

It is an object of the instant invention to provide an improved construction of an adjustable toothed wheel, in which the toothed element thereof is adjustable about the wheel axis.

It is another object of the instant invention to provide an adjustable toothed wheel in which the toothed portion has an infinite range of adjustment.

It is a further object of the instant invention to provide an improved adjustable toothed wheel having gear and pinion means by which the toothed portion of the wheel may be easily adjusted.

It is also an object of the instant invention to provide a toothed wheel in which the toothed portion of the wheel is adjustable about the wheel axis, and is securely held in fixed position after such adjustment.

Still another object of the instant invention is to provide a toothed wheel in which the toothed portion of the wheel may be easily released for adjustment thereof about the wheel axis.

It is still another object of the instant invention to provide a toothed wheel in which the toothed portion thereof is adjustable, and including wedge means for securing the toothed portion in its adjusted position.

Still a further object of the instant invention is to provide an adjustable toothed wheel in which the toothed portion there of may be adjusted while the wheel is retained in the structure of which it is an element.

Other objects of the instant invention will appear hereinafter, the novel features and combinations being set forth in the appended claims.

In the drawings:

FIG. 1 is a plan view of a billet conveyor including toothed wheels constructed in accordance with the instant invention;

FIG. 2 is a sectional view of the billet conveyor, taken on the line 2—2 in FIG. 1;

FIG. 3 is an elevational view of a toothed wheel constructed in accordance with the instant invention;

FIG. 4 is a sectional view of the toothed wheel, taken on the line 4—4 in FIG. 3; and FIG. 5 is a sectional view of the toothed wheel, taken on the line 5—5 in FIG. 3.

Referring to the drawings, there is illustrated in FIG. 1 a billet conveyor 10, which includes a plurality of toothed wheels 20 constructed in accordance with this invention. The billet conveyor 10 comprises a plurality of transverse structural members 11, which support a plurality of longitudinally extending tracks 12 that are disposed at transversely spaced positions on the structural members 11. Two rails 13, 13 are also supported by the structural members 11, with one rail 13 being disposed at each side of the billet conveyor 10. The billets 14 are supported by the rails 13, 13 as they are moved on the billet conveyor 10 from right to left, as viewed in FIG. 1.

The billet conveyor 10 further comprises a foot shaft 15, which is rotatably supported by a plurality of bearings 16 that are disposed at transversely spaced positions. A plurality of idler sprockets 17 are secured to the foot shaft 15 at transversely spaced positions that are aligned with the longitudinally extending tracks 12, there being one sprocket 17 in alignment with each track 12.

A head shaft 18 is rotatably supported by a plurality of bearings 19 at the other end of the billet conveyor 10. A plurality of toothed wheels 20 are secured to the head shaft 18 at transversely spaced positions in alignment with the longitudinally extending tracks 12, each toothed wheel 20 being disposed in alignment with a track 12. Each toothed wheel 20 is a drive sprocket wheel for driving a chain of the billet conveyor 10, as will appear hereinafter.

At each side of the billet conveyor 10 there is provided a suitable power drive means 21, which may include a motor, transmission and coupling elements. The power drive means 21 may be connected to the head shaft 18 by a drive sprocket 22, a drive chain 23 and a driven sprocket 24, the latter being secured to the head shaft 18.

A plurality of longitudinally extending conveying chains 25 are disposed at transversely spaced positions across the billet conveyor 10 in alignment with the longitudinally extending tracks 12. Each conveying chain 25 is trained about an idler sprocket 17 and a toothed wheel or drive sprocket wheel 20. The upper or conveying run of a conveying chain 25 is supported by a track 12. The return run of a conveying chain 25 extends from a sprocket wheel 20 below the transverse structural members 11 to an idler sprocket 17. The billet conveyor 10 usually includes a return track for supporting the return run of a conveying chain 25. Each conveying chain 25 includes a plurality of upright pusher elements 26, which are disposed at longitudinally spaced positions along the length of the chain 25, and are adapted to engage the billets 14 for pushing them or moving them along the rails 13, 13.

It is desired that the load be equally distributed among the several conveying chains 25. Thus, it is important that the conveying chains 25 be disposed with their pusher elements 26 in accurate transverse alignment, so that the pusher elements 26 will all be equally engaged with a billet. In order to correct any misalignment of the conveying chains 25 and their pusher elements 26, that may occur by reason of mechanical failure or ordinary conditions of wear, the sprocket wheels 20 are each adjustable so that a given chain 25 may be moved to the extent necessary to bring it and its pusher elements 26 into transverse alignment with the other conveying chains 25.

Referring to FIGS. 3, 4 and 5, there is illustrated therein the construction of a toothed wheel or sprocket wheel 20, by which adjustment of a conveying chain 25 is effected. The sprocket wheel 20 comprises a frame 30 that is formed with a hub 31, by which the sprocket wheel 20 is secured to a shaft, such as the head shaft 18. A web 32 extends radially outwardly from the hub 31. The peripheral portion 33 of the web 32 is offset in an axial direction to provide an annular seat 34.

A toothed member 35 is formed as a ring and is seated on the annular seat 34, abutting the offset portion 33 of the web 32. The toothed member 35 is formed with a plurality of circumferentially spaced sprocket teeth 36, which are adapted to engage o conveying chain 25 to drive the latter. An adjusting ring 37 is disposed in abutting position against the toothed member 35 and the web 32. The adjusting ring 37 is fixed relatively to the toothed member 35, as will appear hereinafter.

The offset portion 33 of the web 32 is formed with a plurality of arcuate slots 38, which are disposed at equally spaced positions in a circle having its center on the axis of the sprocket wheel 20. Each slot 38 has its ends formed with a circular arc. The length of a slot 38 is taken as the distance between the centers of the circular arcs at the opposite ends of a slot 38. The distance between adjacent slots 38 in the offset web portion 33 is taken as the distance between the centers of the adjacent arcuate ends of adjacent slots. Such distance between adjacent slots 38 is equal to the length of a slot 38.

The toothed member 35 is formed with holes 39, 40 for each slot 38 of the offset web portion 33. The holes 39, 40 are initially aligned with the ends of a slot 38, as seen in FIG. 5. The adjusting ring 37 is formed with holes 41, 42 which are the same size as the holes 39, 40, and are aligned therewith.

The toothed member 35 is secured to the frame 30 by securing means, which may be a plurality of bolts 43, there being one such bolt 43 for each slot 38. As seen in FIG. 5, a bolt 43 extends through a slot 38, a hole 40 and a hole 42. The bolt 43 fixes the position of the toothed member 35 and the adjusting ring 37 relatively to each other. However, the bolt 43 may slide along the slot 38 from one end thereof to the other, whereby the position of the toothed member 35 relatively to the frame 30 may be selectively adjusted. Upon adjustment of the position of the toothed member 35, it is secured in fixed position relatively to the frame 30 by turning a nut 44 up on the bolt 43.

The offset web portion 33 is formed with an inclined surface 45 around each slot 38, as best seen in FIG. 5. A bevel washer 46 is interposed between the head of a bolt 43 and an inclined surface 45, and bears against the latter. The washer 46 is beveled at the same angle of inclination as the inclined surface 45. Thus, when the nut 44 is turned up on the bolt 43, there is a wedging action between the inclined surface 45 and the bolt 43 to further secure the toothed member 35 to the frame 30 and thereby augmenting the securing action of the bolt 43. The direction of inclination of the inclined surface 45 is in accordance with the direction of rotation of the sprocket wheel 20, which is in a clockwise direction, as illustrated in FIG. 3.

The inner surface of the adjusting ring 37 is formed with gear teeth 47 that are engaged by the gear teeth of a pinion 48. A shaft 49 is rotatably mounted on the web 32 of the frame 30. The shaft 49 has an annular flange 50 that abuts one side of the web 32. A bushing 51 rotatably supports the shaft 49 on the web 32. The shaft 49 extends beyond the web 32 to support the pinion 48, which is fixedly secured thereto by a key 52, or other suitable means. A retainer 53 is secured to the web 32 by a pluralit of bolts 54. The retainer 53 extends upwardly over the shaft 49. A snap ring 55 engages the shaft 49 adjacent the outer surface of the retainer 53 to fix the axial position of the shaft 49. The retainer 53 overlies the pinion 48 and maintains it in position on the shaft 49. The shaft 49 is formed with a head 56 that may be square, or may have another form to permit it to be engaged by a wrench or other tool for turning the shaft 49 and the pinion 48.

When it is desired to adjust the toothed member 35 of the sprocket wheel 20, the several bolts 43 are loosened. Adjustment of the toothed member 35 is then effected by rotation of the shaft 49 and the pinion 48. The adjusting ring 37 is rotated by the pinion 48, and moves the toothed member 35 to which it is fixedly connected by the several bolts 43.

The extent to which the toothed member 35 can be adjusted is limited by the length of the slots 38. Thus, as seen in FIG. 5, maximum adjustment of the toothed member 35 would cause a bolt 43 to move from the one end of a slot 38 to the other end thereof. However, such adjusting movement places the holes 39, 41 in alignment with an end of the next adjacent slot 38, whereupon the several bolts 43 may all be removed and replaced in the several holes 39, 41, and further adjustment may then be made until once again the ends of the slots 38 are reached, at which time the bolts 43 are moved back to the holes 40, 42, and adjustment may then continue. Thus, there is provided an infinite degree of adjustment of the toothed member 35.

The instant invention provides an improved construction of an adjustable toothed wheel, in which the adjustable elements thereof are securely held in fixed position during operation of the wheel, and are easily released to permit adjustment as this is needed. The adjustable toothed wheel constructed in accordance with the instant invention may be adjusted while it is retained in assembly in the apparatus of which it is an element. Thus, in the billet conveyor 10, which includes a plurality of toothed wheels 20, each of the wheels 20 may be adjusted as needed, and the adjusting means of the wheels 20 is operative to shift the position of a conveying chain to effect the desired adjustment thereof.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. An adjustable toothed wheel comprising a frame, a circular toothed member mounted on said frame to be supported thereby, an aperture in said frame, an aperture in said toothed member, means extending through said apertures for securing said toothed member to said frame in fixed position relatively thereto, one of said apertures being elongated for adjustment of the positions of said frame and said toothed member relatively to each other, said securing means being releasable to permit adjustment of the positions of said frame and said toohted member relatively to each other, gear means for one of said frame and said toothed member, and pinion means engaged with said gear means to move one of said frame and said toothed member relatively to the other.

2. An adjustable toothed wheel comprising a frame, a circular toothed member mounted on said frame to be supported thereby, at least two circumferentially spaced slots in one of said frame and said toothed member, at least two circumferentially spaced holes in the other of said frame and said toothed member, said holes being disposed at the ends of one slot, the distance between the ends of said slots being no greater than the distance between said holes, means extending through one hole and one slot for securing said toothed member to said frame in fixed position relatively thereto, said securing means being releasable to premit adjustment of the positions of said frame and said toothed member relatively to each other by moving said securing means along said one slot from one end thereof to the other end thereof and then placing said securing means through the other hole and the other slot for further adjustment of the positions of said frame and said toothed member relatively to each other by moving said securing means along said other slot from one end thereof to the other end thereof, there being a plurality of said circumferentially spaced slots which are of equal length and are equally spaced from each other, said plurality of slots being disposed in one of said frame and said toothed member, the distance between said plurality of slots being equal to the length of said plurality of slots, a pair of holes for each slot disposed in alignment with the ends of a slot, said holes being disposed in the other of said frame and said toothed member, and said securing means extending through each slot and one hole of a pair of holes associated with said slot.

3. An adjustable toothed wheel as set forth in claim 2 in which said securing means comprises releasable bolts.

4. An adjustable toothed wheel comprising a frame having a peripheral seat, a circular toothed member mounted on said seat to be supported by the frame, said frame being formed with at least two circumferential slots, said toothed member being formed with at least two holes aligned with said slots, means extending through one of said holes and one of said solts for securing said toothed member to said frame in fixed position relatively thereto, said securing means being releasable to permit adjustment of the position of said toothed member relatively to said frame by moving the securing means from one end of said one slot to the other end thereof and then placing said securing means in the other of said holes and the other of said slots for further adjustment of the position of said toohted member relatively to said frame, a ring abutting said frame and said toothed member, said ring being formed with holes aligned with the holes in said toothed member, said securing means extending through the holes in said ring, and means for adjusting the position of said toothed member and said ring relatively to said frame.

5. An adjustable toothed wheel as recited in claim 4 in which said adjusting means includes a gear formed on said ring and a pinion engaged with said gear for effecting movement of said ring and said toothed member.

6. An adjustable toothed wheel as recited in claim 5 in which said pinion is rotatably supported on said frame.

7. An adjustable toothed wheel comprising a frame having a peripheral seat, a circular toothed member mounted on said seat to be supported by the frame, said frame being formed with at least two circumferential slots, said toothed member being formed with at least two holes aligned with said slots, means extending through one of said holes and one of said slots for securing said toothed member to said frame in fixed position relatively thereto, said securing means being releasable to permit adjustment of the position of said toothed member relatively to said frame by moving the securing means from one end of said one solt to the other end thereof and then placing said securing means in the other of said holes and the other of said slots for further adjustment of the position of said toothed member relatively to said frame, said frame being formed with an inclined surface adjacent each slot, and said securing means including inclined means engaged with said inclined surfaces to provide a wedging action to further secure said frame and said toothed member in fixed position relatively to each other.

References Cited by the Examiner
UNITED STATES PATENTS
2,314,969   3/43   Briggs _____ 74—243

DON A. WAITE, *Primary Examiner.*